Nov. 3, 1953   J. D. GERKEN ET AL   2,657,835
VALVE MECHANISM FOR BEVERAGE DISPENSING DEVICES
Filed Aug. 24, 1949                    2 Sheets-Sheet 1
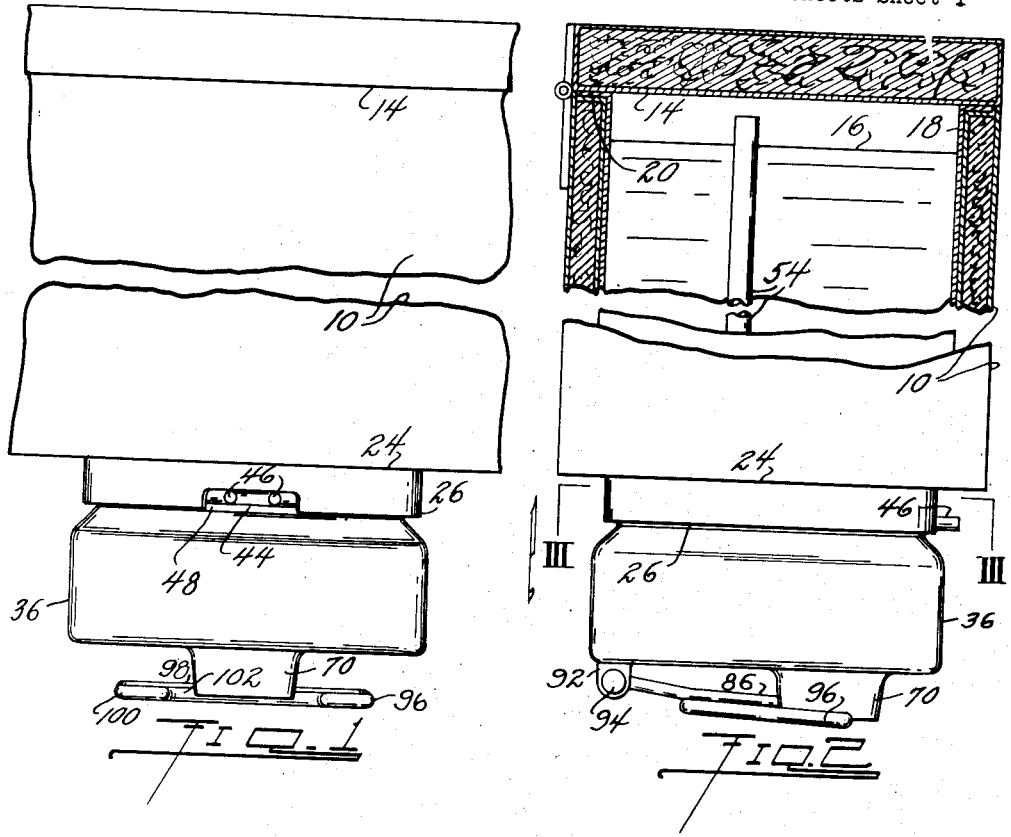
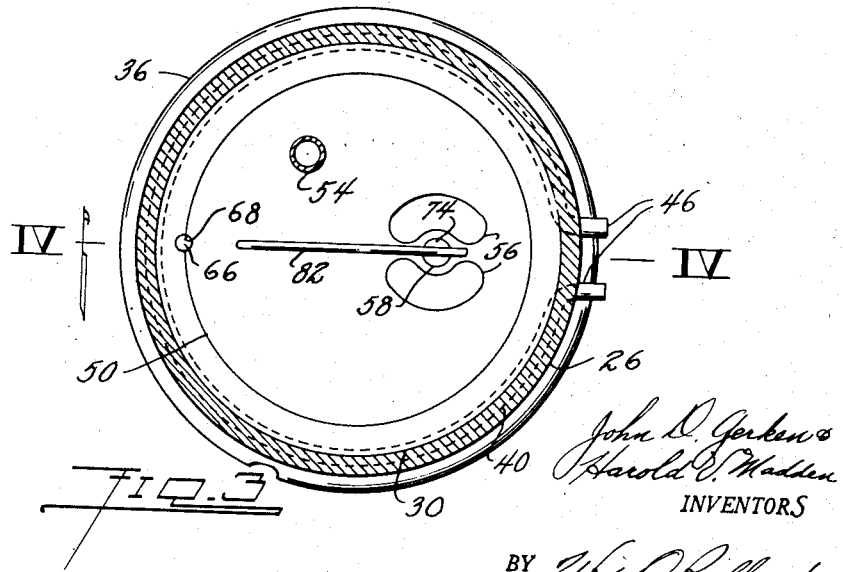
John D. Gerken
Harold C. Madden
INVENTORS
BY Wm. O. Ballard
their attorney

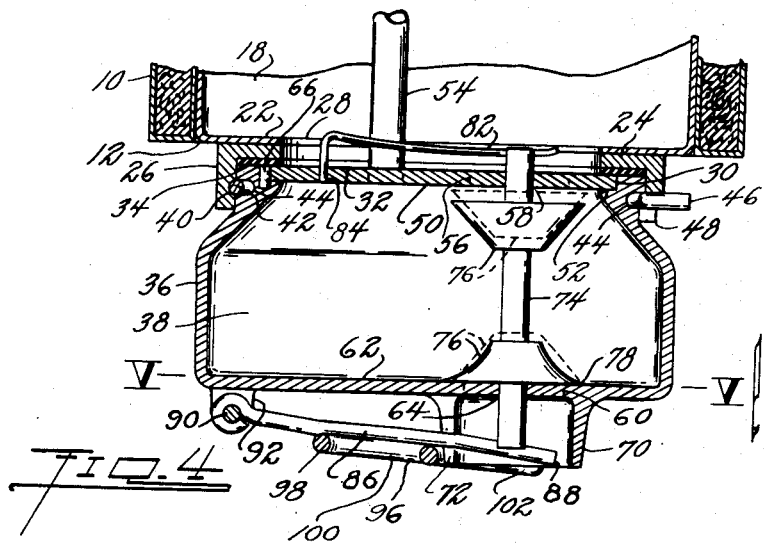
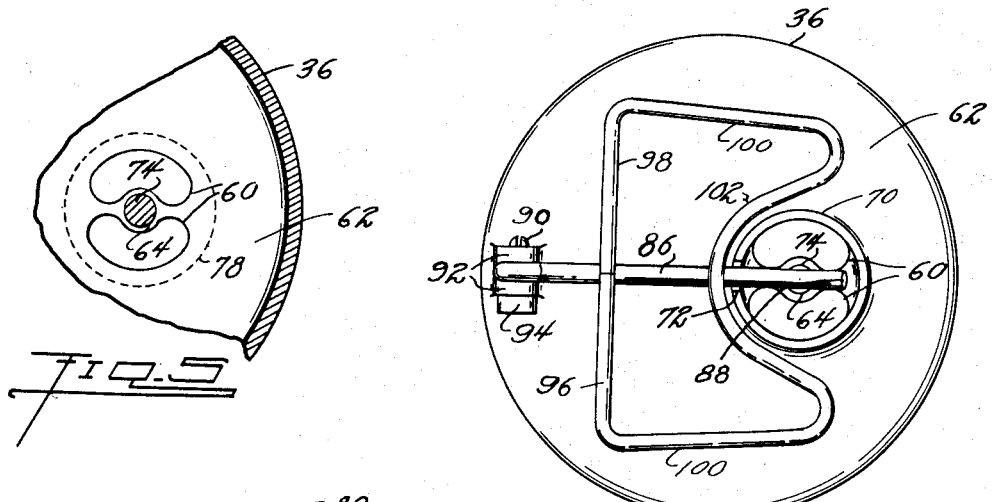
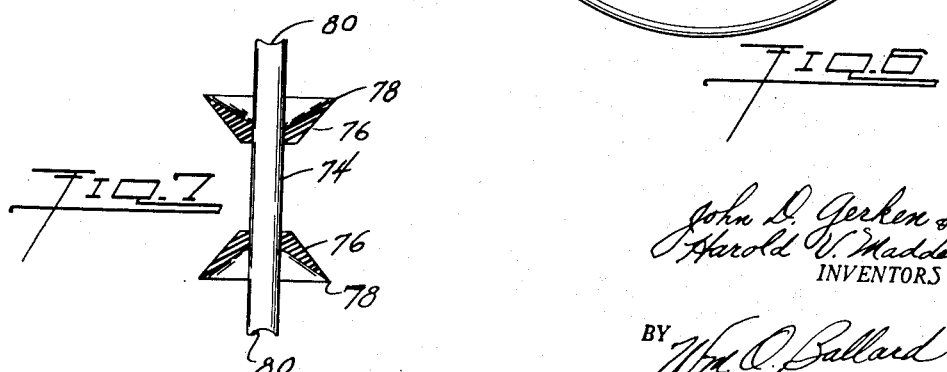

Patented Nov. 3, 1953

2,657,835

UNITED STATES PATENT OFFICE 2,657,835

VALVE MECHANISM FOR BEVERAGE DISPENSING DEVICES

John Dudrich Gerken and Harold Vincent Madden, Toledo, Ohio

Application August 24, 1949, Serial No. 112,148

7 Claims. (Cl. 222—442)

This invention relates to beverage dispensers, more particularly to the outlet or delivery valve construction and its associated parts.

An object of this invention is to provide a mechanism which separates a predetermined volume of beverage from a bulk supply and by means of a single operation, that of bringing a receptacle into contact with an operating lever, deliver the separated volume thereinto and automatically prepare the subsequent measured volume for delivery, at once the receptacle is withdrawn.

An additional object of this invention is to provide a beverage dispensing outlet valve wherein the parts thereof will freely separate from each other upon the operation of a single release, to such an extent the entire surface of every piece may be readily cleaned. Likewise subsequent and easy assembly may be accomplished without the use of any tool.

Still another object of this invention is to provide a beverage dispenser, either fixed or portable, which meets all legal requirements of the most strict sanitation codes now known to be in force.

Still another object of the invention is to provide an operating lever for the valve which may have beverage flow over a portion thereof and any of the beverage which tends to cling thereon will be drained to and from a definite drip point thereby maintaining the remainder of the exposed valve portions free from dampness and the objectionable results thereof.

And another object of the invention is to pro provide an extremely rapid operating dispenser which can deliver measured volumes as fast as an operator would normally dispense such wares as for example hot coffee within a crowd of people such as found at major sporting events.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a front view in part, of a beverage dispenser embodying features of the invention therein;

Fig. 2 is a view from the left of Fig. 1;

Fig. 3 is a view on the line III—III, Fig. 2;

Fig. 4 is a view on the line IV—IV, Fig. 3;

Fig. 5 is a partial view along the line V—V, Fig. 4;

Fig. 6 is a bottom plan view of the valve; and

Fig. 7 is a section longitudinally through the closure carrying element of the valve.

The device includes a tubular heat insulated housing 10 having an open bottom 12 and preferably supplied with a hinged cover 14. This structure may be mounted on a suitable fixed support or may be portable, for example, supplied with handles, a harness or the like. The bulk beverage supply 16 is carried within an open top tank 18 dimensioned to nest within the housing 10 and suspended from an integral upper flange 20 carried by the upper rim of the insulated jacket 10. The floor 22 of the tank is adjacent the lower open end 12 of the housing and has a ring 24 brazed or welded on the lower side thereof which ring provides a depending skirt 26.

The floor 22 has opening 28 therethrough in registry with opening 30 through the ring. Against the underside of the ring within the skirt 26 is gasket 32 providing a seal between the ring and upper rim 34 of cup-shaped housing 36 having chamber 38 therein.

This chamber 38 is an enclosure of calculated dimensions to provide the chamber 38 with a predetermined capacity.

The housing 36 is removably locked with the skirt 26 by means of spring ring 40 engaging groove 42 about the inner face of the skirt 26 and groove 44 about the neck of the member 36 just below the rim 34. This ring 40 is provided with a pair of termini 46 outwardly extending through cut away portion 48 in the skirt 26. The groove 44 is of sufficient depth to allow the ring to be drawn thereinto when the termini 46 are pulled toward each other thereby permitting ready removal of the member 36 and also facilitating assembly of these parts.

The passageway between the bulk tank and the chamber 38 is closed by plate or partition member 50 seated on ledge 52 about the inner portion of the chamber 38 adjacent the rim 34 and in assembly, the top of this plate is flush with the rim 34 so that the gasket 32 also serves as a seal for this assembly. The plate 50 mounts vent pipe 54 extending therethrough and upwardly to terminate above the surface of the bulk beverage 16. The plate 50 is also provided with a pair of arcuate apertures 56 about a circular opening 58. In assembly these apertures 56 are in alignment with a pair of like apertures 60 through the floor of the chamber 38 and opening 64 through said floor is in coaxial alignment with the opening 58.

A pin 66 mounted on the member 36 coacts with notch 68 in the periphery of the plate to insure the above mentioned alignment and maintain the same when the parts are assembled.

Depending from the floor 62 of the member 38, also in coaxial alignment with the openings 58, 64, is delivery spout 70 having slot 72 extending inwardly from the outer edge thereof for the purpose hereinafter described.

The valve mechanism for controlling the flow from the tank 18 into the chamber 38 through apertures 56, and also controlling the discharge from the chamber 38 through apertures 60 and through the spout 70 into a receptacle, includes an element comprising a stem 74 having a pair of spaced flexible cups 76 fixed thereon intermediate its length.

These cups 76 flare outwardly in opposite directions from each other and terminate in feather-edged free rims 78. The stem 74 is provided with a notch 80 across each end. The cups are so positioned on the stem that such element is reversible in use thereby facilitating assembly into the dispenser.

The stem 74 is mounted in openings 58, 64, which serve as bearings therefor, permitting reciprocable movement therein. With the device at rest, the free end of leaf spring 82 engages a notch 80 to force the stem downwardly. This spring 82 has its fixed end fastened in seat 84 in the plate 50.

With the stem 74 depressed, the edge 78 of the lower cup 76 engages the floor 62 around apertures 60 thereby closing these discharge ports. As illustrated in Fig. 4, the force of the spring 82 is sufficient to slightly distort this lower cup when in port closing position. In this position, the upper cup 76 is below the apertures or ports 56, thereby holding this upper valve open when the lower valve is closed. The distorted lower cup will hold the discharge valve closed, when the stem is moved against the resistance of the spring 82, until the upper cup 76 closes the chamber inlet valve or until such is just about to close this inlet. This movement allows the distorted cup to return to normal shape as the stem moves before the cup opens the apertures. The disposition of the cups on the stem permit this valve action for both valves.

A lever or trigger mechanism is provided to operate the valve mechanism. This lever is designed to be engaged by the rim of a receptacle to receive the discharge portion from the chamber 38, such receptacle being a paper cup or any other receiver which may be thrust against the mechanism in operating the same.

A desirable form of such discharge operating mechanism is herein shown as comprising a lever 86 having its free end 88 in position to engage the lower notch 80 of the stem 74, with its remote end hinged on pin 90 carried by lugs 92 depending from the member 36. It is also desirable to have this lever 86 inclined downwardly from its mounting to its free end. By this arrangement any liquid attempting to adhere to the operating mechanism will drain to the free terminus and be discharged off this drip point.

This drip point is protected or shrouded by having the same within the spout 70 and the lever 86 may extend therefrom through slot 72 to its mounting. The pin 90 may be a split-pin device, easily removable and replaced by engaging head 94, to hold the parts in readily separable assembly.

In order that the rim of a receptacle is sure to operate the lever 86, a frame 96 is attached to the lever 86 and is contoured to extend through the regions where even a badly directed cup would engage a portion of the frame. This frame is also contoured to avoid the regions which would permit the receptacle to engage the same until such receptacle is under the spout. As an example of a suitable frame design wherein the cup is to be moved to engage the dispenser from the front, the lever is provided with a cross-member 98 outwardly extending in each direction therefrom. Arms 100 from the termini of said member 98 extend along opposite sides of the spout and are connected by an arcuate reach 102 partially surrounding the spout away from the region toward which the receptacle is thrust into receiving position.

As the receptacle is thrust upwardly against any part of the lever or attached frame, the stem 74 is lifted, the lower valve opened and the chamber contents drained through apertures 60. Simultaneously, the upper valve is closed. When the receptacle is removed, the spring 82 forces the stem downwardly closing the discharge valve and opening the upper valve. The chamber is then refilled from the bulk supply through apertures 56. Only a partial discharge from the chamber may be withdrawn and subsequently the valves operate in their usual manner.

To meet all sanitation requirements, the beverage contacting parts are entirely free from sharp corners, the metals used are of the approved types and the flexible parts, as the gasket and valve cups are of "dairy" rubber, neoprene or the like. Removal of the ring 40 permits the parts to separate easily and so easily washed and sterilized.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. A dispenser for liquids comprising a bulk liquid tank having an outlet through the floor thereof, a cup-shaped member suspended beneath said outlet having a chamber therein of a predetermined capacity for receiving successive liquid portions from the tank, a partition across said outlet having an aperture therein for the liquid to flow therethrough from the tank into said member, said partition providing a first bearing adjacent said aperture, said member having a discharge port and a second bearing adjacent thereto in alignment with said first bearing, a stem reciprocable in said bearings, a first flexible cup-shaped closure carried by said stem for sealing said aperture at one directional limit of its reciprocation, a second flexible cup-shaped closure carried by said stem in spaced relationship from said discharge port when said first closure seals said aperture, and spring means normally shifting said stem to move the second closure into port sealing position and move the first closure clear of the aperture.

2. In a liquid dispenser, a bulk tank having an opening through the floor thereof, a ring attached to the tank surrounding said opening and providing a skirt depending therefrom, said skirt having a peripheral groove about the interior thereof, a cup-shaped chamber providing member having its upper portion terminating in a neck to nest within said skirt, said neck having a groove externally about its periphery which latter groove is in substantial alignment with the skirt groove when the parts are assembled, said skirt having a cut-away portion inwardly from its outer rim edge to expose a comparatively short extent of the groove in said neck, a split spring ring coacting with said grooves and having terminal offsets outwardly extending through said cut-away portion to form a removable lock therebetween, a seat about the interior of the neck of said cup-shaped member, a plate carried by said seat forming a partition between said tank floor opening and the interior of the cup-shaped member, said partition having an aperture therethrough, a discharge port from said chamber, a pair of aligned bearings, one in said partition and the other through the bottom of said cup-shaped member, a stem reciprocable in said bearings, a pair of closures mounted on said stem to alternately open and close the aperture and the discharge port, and means for reciprocating said stem.

3. In a liquid dispenser, a bulk tank having an opening through the floor thereof, a ring attached to the tank surrounding said opening and providing a skirt depending therefrom, a cup-shaped chamber providing member having its upper portion terminating in a neck nesting within said skirt, means for detachably locking said neck within said skirt, a seat in the interior of said neck, a plate carried on said seat and forming a partition between said tank floor opening and the chamber, said partition having an aperture therethrough, a discharge port from said chamber, a pair of aligned bearings, one in said partition and the other through the bottom of said cup-shaped member, a stem reciprocable in said bearings, a pair of flexible cup-shaped closures mounted on said stem oppositely flared toward said aperture and port and shiftable with said stem to alternately open and close the aperture and the discharge port, and means for reciprocating said stem.

4. The structure set forth in claim 3 wherein a gasket is disposed within the skirt between the rim of the cup-shaped member and the tank, said gasket extending over the joint made between the partition plate and interior periphery of the neck to seal the space between said neck and tank and between said neck and plate.

5. The structure set forth in claim 3 wherein a vent pipe is mounted by said partition plate to extend therethrough and upwardly therefrom through the tank to terminate above the surface of the liquid supply therein.

6. In a liquid dispensing device of the class described, a bulk tank, a chamber in communication therewith by means of an aperture through a partition therebetween, a discharge port from the chamber in substantial alignment with said aperture, a valve element comprising a stem longitudinally reciprocable in said chamber, a pair of flexible cup-shaped elements mounted on said stem oppositely flared toward said aperture and port, one shiftable with said stem toward and from said aperture to surround and close said aperture, the other shiftable with said stem to surround and close said port, said elements linearly disposed to permit stem movement beyond element closing position to distort the closing element and thereby allow additional shifting of the other element, and means for reciprocating said stem.

7. The structure set forth in claim 6 wherein the cup-shaped elements provide feather-edged rims to engage the structures surrounding the aperture and the port and permit distortion of said elements during their closing operation.

JOHN DUDRICH GERKEN.
HAROLD VINCENT MADDEN.

References Cited in the file of this patent

UNITED STATES PATENTS

| Number | Name | Date |
|---|---|---|
| Re. 11,560 | Arper | July 28, 1896 |
| 785,094 | Fribourg | Mar. 21, 1905 |
| 1,717,672 | Fitch | June 18, 1929 |
| 1,970,505 | Parkin | Aug. 14, 1934 |
| 2,216,347 | Humbard | Oct. 1, 1940 |

FOREIGN PATENTS

| Number | Country | Date |
|---|---|---|
| 17,962 | Great Britain | July 29, 1914 |